Patented Nov. 17, 1925.

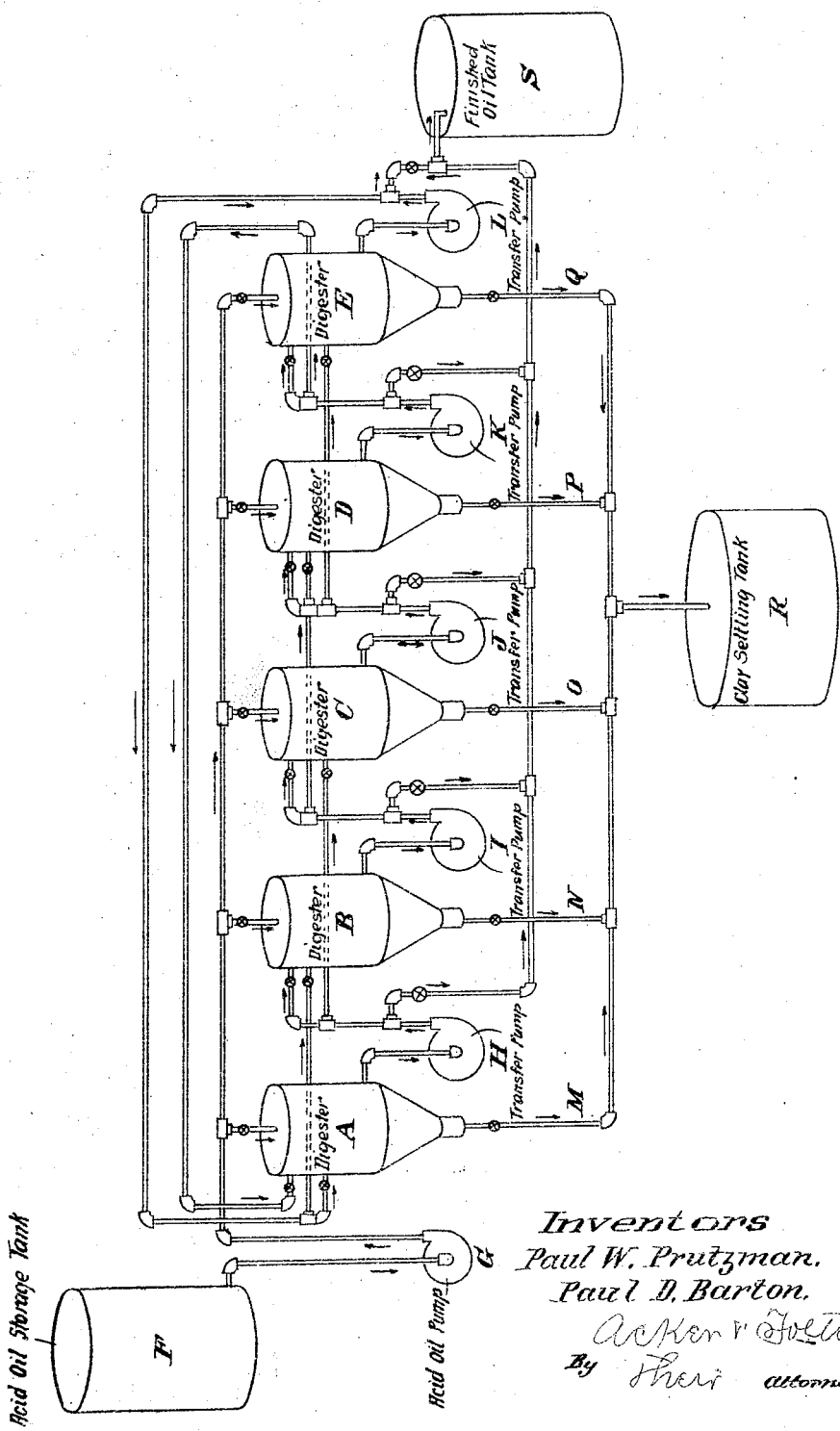

1,562,000

UNITED STATES PATENT OFFICE.

PAUL W. PRUTZMAN AND PAUL D. BARTON, OF LOS ANGELES, CALIFORNIA, ASSIGNORS TO GENERAL PETROLEUM CORPORATION, OF LOS ANGELES, CALIFORNIA, A CORPORATION OF CALIFORNIA.

PROCESS FOR REMOVING ACIDS FROM OILS.

Application filed September 2, 1922. Serial No. 586,040.

*To all whom it may concern:*

Be it known that PAUL W. PRUTZMAN and PAUL D. BARTON, citizens of the United States, residing at Los Angeles, in the county of Los Angeles and State of California, have invented certain new and useful Improvements in Processes for Removing Acids from Oils, of which the following is a specification.

The hereinafter described invention relates to a method treatment for acid treated oils generally, and for the purification thereof, although the same is more particularly adapted for use in connection with the treatment of mineral lubricating oils and for the removal therefrom of the tarry ingredients and the dark-colored constituents thereof, and one of the objects of the invention is to carry out the treatment of oils for this purpose at a less cost for the material employed in the treatment thereof, with less labor and with less fuel than has heretofore been required in the treatment of such oils.

A further object of our invention is to produce from an acid-treated mineral oil either a commercially neutral or an absolutely neutral finished product, without making use of any alkaline substance to neutralize the acidity, thus avoiding the formation of any objectionable soaps, salts, or other ingredients.

A further object of our invention is to effect the neutralization of an acid oil without the darkening of color which, in the ordinary methods of treatment, arises in the re-solution of floating acid tar by the neutralized oil.

When such mixtures of hydrocarbons and other bodies as occur in raw lubricating distillates from petroleums are treated with strong sulfuric acid in the manner commonly practiced, the acid reacts with certain constituents of the oil and forms with them a thickly viscid mass commonly called "acid tar."

As the acid and the oil are, to a large extent at least, mutually insoluble, they are intimately mixed to promote reaction, usually by means of an air blast. The acid is thus brought into the state of a temporary emulsion in the oil, and this condition is maintained, but continuance of the agitation, until the acid has expended its available energy.

When agitation is discontined the acid tar is left floating in the oil in which, under the conditions then obtaining, it is practically insoluble. The coarser particles soon subside, being materially heavier than the oil, collect into a semi-fluid mass, and may be withdrawn. The finer particles subside very slowly, particularly from heavy and viscous oils, and it is rarely possible to allow the acid oil to rest long enough to allow these fine particles to settle out completely.

The acid tar is, as said, essentially insoluble in the oil, but only so long as it contains an excess of acid. If any body having the property of either neutralizing or dissolving the acid, such as an alkali or alkaline earth, an alkaline solution, or even a material proportion of water, be mixed with the oil in which the fine tar is suspended, the excess of acid which renders the tar particles essentially insoluble in oil will be withdrawn from such particles by the alkali or water, and the tarry portion of the particle will thereby be rendered quite freely soluble in the oil, particularly at temperatures somewhat above normal.

As the acid tar is a deeply colored body, having a high tinctorial value, re-solution of tar may and usually does seriously depreciate the color of the oil; and as this tar contains the impurities withdrawn from the oil by the acid treatment, as well as others formed by the action of the acid on certain other elements of the oil, re-solution of tar causes the oil to be contaminated with the very impurities which it is the object of the acid treatment to remove.

After application of sulfuric acid to mineral oils followed by complete removal of the tar, the oil is still left in an acid condition. This acidity is due to the presence of free sulfuric acid mechanically held, to organic compounds such as sulfonic acids and alkyl sulfuric acids, which are often more soluble in oil than in either tar or water, and in many cases to certain bodies existing in the raw material, having the properties of acids, and known as petroleum acids or naphthenic acids.

All of these acids except possibly the naphthlenic acids are reactive to metals, causing corrosion, and therefore cannot be left in the finished lubricating oil. Further, they are unstable to air and light and if allowed to remain, even in slight traces, will cause the oil to darken in color and acquire an unpleasant odor, by either of which changes its commercial value is much lessened.

To destroy these acid bodies it is customary to add to the oil and alkaline solution, usually of caustic soda, by which the acids are neutralized. That is to say, they are converted into sodium salts, many of which salts are viscid, stringy liquids quite similar in appearance and behavior to the potash soaps of the higher fatty acids.

These salts or soaps were long supposed to be completely soluble in water, and also to be harmless if small proportions were left behind on washing the oil with water. It is now recognized that they are only partly water soluble, so that water washing can never remove them completely, and also that remaining traces too small to effect the appearance of the oil are highly deleterious to its quality.

To effect the removal from the oil of these sodium salts it is customary to wash the oils with water, by adding to the batch successive doses of water, mixing each dose with the oil until it has taken up a portion of the water-soluble elements, then allowing the water to subside and withdrawing it. This process is repeated until no further solution of salts can be had, and the water settles out clear and bright.

Washing is liable to be a difficult and tedious operation, particularly if the oil be very viscous or the proportion of salts in the oil be large. This difficulty is founded in the soapy nature of some of the sodium salts, which causes them to act as efficient emulsifying agents, so that the wash waters often settle out slowly, and in settling entrain and carry away a considerable proportion of the oil itself. In extreme cases the entire mass of oil, soap and water forms a permanent emulsion, which cannot be profitably separated, and in such cases the cost of treatment of the batch is lost.

Again, in water washing after neutralizing with an alkali, only such portions of the salts as are more soluble in water than in oil can be removed. Thus such salts as are more soluble in oil than in water (and these are almost always present) are left behind, yielding a finished oil prone to emulsify with water, and having a high ash content.

Again, if an excess of strong alkali be used, or if the proportion of sodium sulfate in the neutralization product be high, the alkali or the salt, as the case may be, will often salt out the soapy bodies in a form in which they are soluble in neither water nor oil. As this rejected mass has the consistency of soft soap, the tightest and most resistant emulsion possible is often formed.

Again, when a large proportion of water is added to a solution of an organic salt or soap, hydrolysis takes place, with separation of a variable proportion of such salt into its original constituents, viz: an acid body and an alkaline body. In such cases the alkaline body remains in solution in the water, while the acid body passes back into solution in the oil. It is not only possible, but is actually a very common occurrence, to obtain an oil having an acidity too high for certain uses, even after repeated washings with alkaline waters.

Under our invention depreciation of color by re-solution of acid tar; the cost of long continued water washing; the loss of oil incident to partial emulsification during washing; the danger of complete emulsification during washing; and the likelihood of irremovable acidity in the finished product are avoided by substituting for alkali and wash waters the use of certain clays and other solid adsorbent materials which, without themselves reacting with these bodies, may be made the means by which the floating tar and the dissolved acidity are taken up. On subsequent removal of the solid material, by sedimentation or filtration or other mechanical means, the tar and the acid bodies are removed along with the solid material in and on which they are fixed. The purified oil is thus left clean, brilliant, neutral, free from soaps or salts, resistant to emulsification, and with a very low ash content.

The power of adsorbing acidity from oils is a specific property of many clays and other adsorbent solids. Its existence may be discovered and its value determined by preparing a sample of acid oil, freeing this sample from tar, determining the acidity of the tar-free oil by titration with an alkaline solution of known strength, adding a sample of the finely ground adsorbent, warming the oil until limpid, stirring for several minutes, filtering out the clay or other adsorbent used, and again determining the acidity of the oil by titration. If the acidity of the oil after the clay application is less than it was before such application, then the clay or other adsorbent has the property of adsorbing acidity, and is suited for use in the carrying out of our invention.

It will be obvious that if the above test is carried out with weighed quantities of materials the adsorption of acidity may be reduced to a number, as for instance, the equivalent in milligrams of potassium hydrate per gram of adsorbent taken. By this means the relative values for this purpose of various clays and other adsorbents may be compared.

Various adsorbent materials may be used for the purposes of our invention, including many natural clays and particularly such as are classed as "floridins" or decolorizing clays, the mineral bauxite, the mineral halloysite, the mineral otaylite or montmorillonite, and the residues resulting from the sulfuric acid treatment of the above minerals. Light adsorbent bodies, such as the animal and vegetable chars, are not suited to use in this process as they do not settle readily enough. Clays or other minerals containing any notable alkalinity, if this alkalinity is in a form readily reactive with sulfuric acid, are not suited for use in this process, as they are likely to produce salts with the acid bodies in the oil, which salts may remain in the oil to deteriorate its quality.

It will be understood that where the term "adsorbent" is used herein we refer to a powdered solid substance, having the property of adsorbing acidity from an oil previously treated with sulfuric acid, and essentially free from substances which react with small quantities of weak sulfuric acid to form mineral salts.

To secure the best results under our process the adsorbent should be ground to a powder, but not of the finest grain. The rule is that finer grinding gives more rapid adsorption of acid bodies and slower settling from the oil, and the best fineness is that at which these two properties are so balanced as to allow the total effect to be had in the minimum of time. The most desirable fineness in most cases is that at which the powder will pass completely through a standard 100 mesh sieve and be completely retained on a standard 200 mesh sieve. This grade of powder is often difficult and expensive to prepare and a powder passing completely through a 100 mesh sieve only is an approved grade for the purposes of this invention. Even less finely ground powders may be used, though to less advantage, and the mesh above specified is a preferred grade only.

In the carrying out our method invention we apply the clay to the oil in a number of small doses, removing each dose by settling it and decanting the oil before adding the next. This dosage is continued until the acidity is completely removed from the oil, or until it is reduced to the allowable minimum fixed by the use to which the oil is to be put. The clay doses are not discarded after once using, but are applied to successive quantities of oil each more highly acid than the one preceding it, and finally to a quantity of new acid oil containing the maximum proportion of acidity and also any floating tar which may remain from the acid treatment of the oil. By this means a cycle of operations is set up, in which as the acidity of the oil is decreased it is brought into contact with successive quantities of less and less saturated adsorbent, while the clay doses as they adsorb acid and decrease in adsorptive value are brought progressively into contact with successive quantities of oil of increasing acidity. Thus, what might be termed a head or potential of acidity concentration is maintained against the clay, and by this means the clay is enabled to adsorb all the acidity from the oil and at the same time to become itself saturated with adsorbed acids.

Any suitable apparatus may be employed for the carrying out of our method invention, a simple effective and practical apparatus being shown in the accompanying drawing, wherein the reference letters A, B, C, D and E are digesters, in which oil and adsorbent are mixed. R is a settling tank into which the spent adsorbent is discharged for the purpose of recovering a portion of the oil contained therein. F is the storage tank for the oil prior to the treatment by the present process. G is a pump by means of which acid treated oil is transferred from F to any one of the five digesters. H, I, J, K and L are pumps, preferably of the centrifugal type, by means of which the liquid contents of each of the digesters may be transferred to either of the two digesters next to it in the cycle, thus: A to B or C, B to C or D, C to D or E, D to E or A, and E to A or B. M, N, O, P and Q are pipes through which the adsorbent, after subsiding to the bottom of the digesters, may be drawn to the settling tank R. S is a tank into which the finished product, still containing some suspended clay, is discharged for storage prior to filtration or other process of removal of such suspended matter.

To start the operation and set up the cycle it is necessary to use new clay and to proceed in the following manner.

Digester A is filled with acid oil from F, and a clay dose sufficient to agglomerate and knock down the tar is added. The batch is then thoroughly mixed, by circulating through pump H, or by means of any suitable mixing device not shown, within the digester. A screw propeller set close to the point of the cone of the digester, and arranged to operate at high speed, is a preferred type of mechanical agitator for this purpose. An air blast may be used instead of a mechanical agitation, but is less desirable, as the final product will have a poorer color and the clay doses will settle less rapidly. Whatever means of agitation is used, agitation is continued until the tar is thoroughly agglomerated into relatively coarse grains by adhesion to the clay grains and by the adhesion of such particles to each other. When this point is reached the clay and tar will settle readily from the oil, leaving it essentially clear but of a very dark color. If the oil is viscous it may be heated, but the lowest possible temperature should be used, as while a higher temperature accelerates the operation it is liable to cause re-solution of the tar if applied to an oil not already freed from most of its acid. It should not be necessary to heat over 100° Fahr. with an ordinary oil, and such heat should be applied as gently as possible, by means of immersed coils heated by low pressure steam, or preferably by means of an exhaust steam or warm air jacket.

As soon as the oil is freed from tar as above described the agitation is interrupted, and the clay and tar allowed to settle. When the solid content has settled to a sharp line, the supernatant oil is transferred through pump H into digester B, and the slush of clay, tar and oil is drawn through pipe M into settling tank R.

When the pumping from A to B is completed, A is refilled with acid oil from F, and each digester is given a dose of new clay, mixed and settled as before.

The oil from digester B is now pumped off into C, leaving the clay behind. The oil from A is pumped into B on top of the clay remaining there. The clay slush is drawn from A into tank R, and A is refilled with fresh acid oil from F. A and C are given fresh clay doses, and the three digesters are mixed and settled as before.

The oil from digester C is now pumped off into D, leaving the clay behind. The oil from B is pumped off into C, leaving the clay behind. The oil from A is pumped off into B, the clay slush is drawn from A into tank R, and A is refilled with fresh acid oil from tank F. A and D are given fresh doses, and the four digesters are mixed and settled as before.

The oil in digester D has now had four doses of clay, and we will assume for illustration that the dose has been so proportioned that this number is sufficient to finish the treatment and yield a neutral oil. The oil in this digester is therefore pumped into tank S, from which it is taken to have the last traces of clay removed by filtration or other convenient manner. The oil in digester C is now pumped into E; it has had three doses of clay, and is given a fourth dose of new clay in E. The oil in digester B has had two doses of clay, and is pumped on top of the clay remaining in D, which has been applied to one batch of oil. The oil in digester A has had one dose of clay, and is pumped on top of the clay remaining in C, which has been applied to two batches of oil. Digester B is refilled with fresh acid oil from F, on top of the clay remaining in B, which has been applied to three batches of oil. The clay remaining in A, which has been applied to a batch containing acid tar, is useless and is drawn down to tank R.

The full cycle of operation is now established, and thereafter the operations of pumping, introducing new oil and clay, mixing and settling repeat themselves indefinitely. For instance, after the next mixing and settling following the last operation described above, the oil in digester E is pumped out of the cycle, into tank S. The oil in digester D has had three doses, and is pumped into the empty digester A to be given a new dose. The oil in digester C has had two clay doses and is pumped into E on top of clay which has been once used. The oil in digester B has had one clay dose, and is pumped into D on top of clay which has been twice used. Fresh acid oil is pumped into C on top of clay which has been used three times. The clay remaining in B has been used four times, and is drawn out of the cycle, into tank R. Each time the cycle is repeated we take out a batch which has had four doses of clay and add a new dose of clay, at one end, and add a batch of fresh oil and discard a dose of clay which has been used four times, at the other end of the cycle.

A cycle of four doses is given merely by way of illustration, and because it is a generally useful and desirable number of doses, but good results may be had by using a greater or less number. In any case, as will be shown by the examination of the cycle just stated, only one dose of new clay is added to the cycle for each batch of new oil added, so that a single dose of clay, though it takes acidity from four different batches of oil, has to take up in total just the amount of acidity originally present in one batch of fresh oil, so that the size of the clay dose is determined by the capacity of the clay and the amount of acidity present in one batch of oil, while the most favorable number of doses is the smallest number with which the clay can be completely saturated in its progress through the cycle, so that none of its capacity shall be lost. Given complete saturation of the clay, a larger number of doses merely increases the amount of pumping and labor, without obtaining any further work from the clay.

It will be understood that the number of doses of adsorbent, the temperature at which they are applied, and the form of apparatus shown, are for illustrative purposes only and it is not our intent or desire to be understood as limiting or restricting the invention to the particular method steps hereinbefore set forth, inasmuch as the spirit of our invention lies or resides in the application to an acid oil of a plurality of doses of adsorbent, and in the application of each dose of adsorbent to a plurality of quantities of oil of essentially equal volume.

Having thus described our invention, what we claim as new and desire to protect by Letters Patent of the United States, is:—

1. The method of utilizing an adsorbent for removing acid-tar from tar-containing acid-treated oils without any loss of its adsorbent value, which resides in first utilizing the said adsorbent for reducing the acidity of tar-free acid-oils, and then agitating the expended adsorbent removed from such tar-free oil with oil containing tar, for the removal from such tarry oil of the tar suspended therein.

2. The method of removing acid-tar from acid-treated petroleum oil containing tar, which consists in the agitation with such oil of a powdered adsorbent, which adsorbent has previously expended its adsorptive value in removing impurities from tar-free oils and is charged with said tar-free oil.

In testimony whereof we have signed our names to this specification.

PAUL W. PRUTZMAN.
PAUL D. BARTON.